United States Patent
Taylor et al.

(10) Patent No.: US 9,152,550 B1
(45) Date of Patent: Oct. 6, 2015

(54) STORAGE SYSTEM WITH DYNAMIC TRANSFER OF BLOCK FILE SYSTEM OWNERSHIP FOR LOAD BALANCING

(75) Inventors: Alan Lee Taylor, Cary, NC (US); Paul T. McGrath, Raleigh, NC (US); David W. Harvey, Newton, MA (US); Peter E. Tolvanen, Mendon, MA (US); Miles A. de Forest, Bahama, NC (US); Dayanand Suldhal, New Canaan, CT (US); Nagapraveen Veeravenkata Seela, Cary, NC (US); David Haase, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 195 days.

(21) Appl. No.: 13/435,307

(22) Filed: Mar. 30, 2012

(51) Int. Cl.
*G06F 12/00* (2006.01)
*G06F 12/02* (2006.01)

(52) U.S. Cl.
CPC .................................. *G06F 12/0246* (2013.01)

(58) Field of Classification Search
CPC . G06F 12/0246; G06F 3/0647; G06F 3/0601; G06F 3/0689
USPC ........................... 711/148, 162–165; 370/389
See application file for complete search history.

(56) References Cited

U.S. PATENT DOCUMENTS

| | | | | |
|---|---|---|---|---|
| 5,893,922 A | * | 4/1999 | Baylor et al. | 711/148 |
| 6,453,408 B1 | * | 9/2002 | Fiske et al. | 712/29 |
| 6,530,038 B1 | * | 3/2003 | Hughes et al. | 714/15 |
| 7,010,553 B2 | * | 3/2006 | Chen et al. | 1/1 |
| 7,840,618 B2 | * | 11/2010 | Zhang et al. | 707/827 |
| 8,380,673 B2 | * | 2/2013 | Anzai | 707/655 |
| 2003/0115434 A1 | * | 6/2003 | Mahalingam et al. | 711/165 |
| 2005/0268033 A1 | * | 12/2005 | Ogasawara et al. | 711/114 |
| 2006/0153188 A1 | * | 7/2006 | Doi et al. | 370/389 |
| 2007/0226331 A1 | * | 9/2007 | Srinivasan et al. | 709/223 |
| 2010/0011035 A1 | * | 1/2010 | Adkins et al. | 707/204 |
| 2010/0174941 A1 | * | 7/2010 | Rajadeva et al. | 714/15 |
| 2011/0179082 A1 | * | 7/2011 | Vaghani et al. | 707/781 |
| 2012/0278569 A1 | * | 11/2012 | Kawakami et al. | 711/162 |

* cited by examiner

*Primary Examiner* — Aimee Li
*Assistant Examiner* — Trang Ta
(74) *Attorney, Agent, or Firm* — BainwoodHuang

(57) ABSTRACT

A storage system uses a block-level file system to manage physical storage of data blocks of logical units, the file system being mounted on an owning one of a set of storage processors. The storage processors redirect received storage requests to the owning storage processor, and periodically the amount of redirection is evaluated. If the amount of redirection is higher than a threshold, then the file system is dismounted at the owning storage processor and mounted at another storage processor to reduce the amount of redirection.

21 Claims, 4 Drawing Sheets

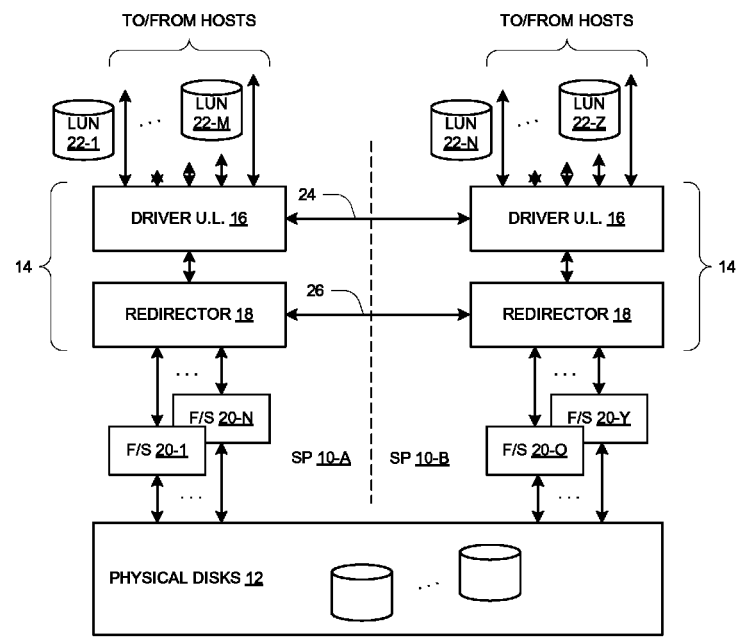
Fig. 1
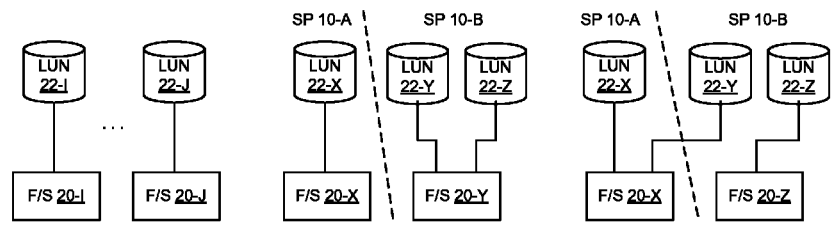
Fig. 2   Fig. 3   Fig. 4

STORAGE SYSTEM WITH DYNAMIC TRANSFER OF BLOCK FILE SYSTEM OWNERSHIP FOR LOAD BALANCING

BACKGROUND

The present invention is related to the field of data storage.

Data storage systems may employ a block file system to manage the use of physical storage resources (e.g., areas of physical disks) in providing higher-level logical units of storage to applications or users in a data processing system. This is particularly the case for storage systems supporting mapped logical units (MLUs) used in "thin provisioning" schemes of storage allocation, where physical storage resources are assigned to logical units of storage dynamically as needed during operation rather than statically at an initial time of configuration. The block file system defines a corresponding file for each MLU and conducts block-level file-access operations in satisfaction of storage input/output requests (reads and writes) directed to the MLU. Here "block-level" refers to operations on fixed-size data units called "blocks", a technique long known in the computing industry. One example of a block file system is the Common Block File System (CBFS) utilized in storage products manufactured and sold by EMC Corporation.

SUMMARY

In certain storage applications, it is desirable that a single block file system support multiple files for corresponding logical units of data, herein referred to as "LUNs" and which may be mapped logical units (MLUs). This need arises, for example, when features such as replication or data deduplication are provided by the storage system. In the case of deduplication, for example, a set of LUNs that form a domain for deduplication purposes preferably all share a single file system that creates and manages file-based mappings of LUN blocks to physical blocks for the LUNs. The file system recognizes duplicate data blocks across the LUNs and maps duplicated blocks to a single physical data block. In this kind of situation, all accesses to any of the LUNs that share a file system are necessarily processed by the shared file system.

Another feature of modern storage systems is the use of multiple storage processors (SPs) that have interfaces to external users and carry out storage requests received from such users. In some configurations, different LUNs may be "exposed" (presented for use) to external users via different SPs, while each block file system is at any given time owned by only one of the SPs. In the case that different LUNs that share a file system are exposed via different SPs, there is preferably a mechanism by which one SP can automatically forward or redirect a received storage request to another SP. This way, if a storage request is received at an SP that does not own the underlying block file system, the request can be forwarded for processing to the SP that owns the file system. However, this redirection functionality can create performance issues if the amount of redirection is very high, as latency is added and system resources are wastefully used in simply transferring requests internally from one SP to another. It is desirable to address this performance issue in order to achieve desired performance and efficiency in storage systems that employ block file systems in providing advanced storage features.

A method of operating a storage system is disclosed, where the storage system has a set of storage processors coupled to a set of physical storage devices that provide underlying physical storage for logical units of storage. The storage system uses a block-level file system to handle block-level physical data storage operations for data of two or more logical units of storage presented to external users of the storage system, where each logical unit of storage is organized into an array of data blocks and is associated with a respective distinct file in the block-level file system. The block-level file system is at any given time mounted on (or owned by) one of the storage processors.

Each storage processor continually performs a redirection operation by which storage requests for data of any of the logical units of storage are redirected to the owning storage processor from each other storage processor of the set receiving the storage requests. For requests received at the owning storage processor, the redirection operation allows the requests to be processed locally rather than being directed to another storage processor. Periodically, the amount of redirection that is occurring for the storage requests to a specific file system is evaluated. If the amount of redirection is higher than a predetermined threshold, then the file system is dismounted at the owning storage processor and mounted at another storage processor to reduce the amount of redirection. In a system having two storage processors, this transfer is to the other (currently non-owning) storage processor, which is indicated by the evaluation to be receiving a higher proportion of the storage requests to be processed by the file system. In systems having more than two storage processors, the evaluation and transfer may involve tracking and measuring redirection on a per-storage-processor basis (i.e., tracking redirections from each of multiple non-owning storage processors to the one owning storage processor).

By the above technique, as a pattern of storage requests changes in a way that increases the amount of redirection occurring in the storage system, the system automatically moves the target resource (block file system) to another storage processor to reduce the amount of redirection, improving overall performance and efficiency of operation. This can be viewed as a form of load balancing, dynamically assigning file system ownership among the storage processors to make more effective use of their computing resources.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a schematic block diagram of a storage system;

FIGS. 2 through 4 are schematic depictions of relationships between logical storage units (LUNs) and underlying file systems;

DETAILED DESCRIPTION

Figure 5:
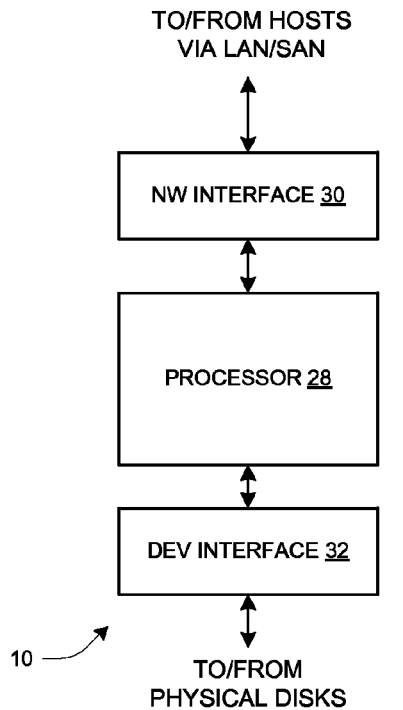
FIG. 5 is a block diagram of a hardware organization of a storage processor.

FIG. 1 shows a storage system from primarily a functional or logical perspective, with some hardware components also depicted. Among the hardware components are storage processors (SPs) 10-A, 10-B and physical disks 12. The SPs 10, which are also referred to as SP A and SP B herein, each include a device driver 14 having a driver upper layer (U.L.)

16 and redirector 18, along with one or more file systems (F/S) 20 (identified as 20-1 through 20-N for SP 10-A, and 20-O through 20-Y for SP 20-B). The file systems 20 have functional connections to the physical disks 12. Each driver upper layer 16 has logical interfaces to separate host computers (hosts) that use the storage resources provided by the storage system, these resources being presented to the hosts as logical units (LUNs) 22 (identified as 22-1 through 22-M for SP 10-A, and 22-N through 22-Z for SP 20-B). As shown, the driver upper layers 16 and redirectors 18 of the SPs 10-A, 10-B are coupled by respective communication channels 24, 26.

Each file system 20 is a so-called "block" file system, implementing the storage of one or more respective LUNs 22 as a collection of fixed-size data units ("blocks") distributed among the physical disks 12. Block file systems support sophisticated modern storage features such as mapped logical units (MLUs), which are logical units of storage whose underlying physical storage resources are allocated dynamically during operation rather than statically at an initial configuration time. The use of MLUs can significantly increase the efficiency of storage use in a data processing system. In the present context, a block file system also supports features such as replication (snapshots) and data de-duplication. A block file system maintains a low-level mapping between data units of the LUNs 22 and underlying blocks stored on the physical disks as known to those skilled in the art. As currently used, a file system 20 is available for use by only one SP 10, such availability being referred to as being "mounted" on the SP 10 (or "owned" by the SP 10). Thus in FIG. 1, file systems 20-1 through 20-N are mounted on SP A, while file systems 20-O through 20-Y are mounted on SP B.

As generally known, a LUN is a unit of storage organized as a linear array of addressable storage locations. The storage system may be utilized in a direct-attached or storage area network (SAN) environment, in which case it typically exposes the LUNs 22 to external requestors as shown. Alternatively, it may be of a type commonly referred to as "network-attached storage" or NAS, in which case it typically implements a network file system and exposes storage resources as volumes of that file system (e.g., a network drive as commonly known in Windows® networks), using LUNs internally to represent units of storage assigned to the volumes. Such a network file system is not to be confused with the block file systems 20. In either the NAS or SAN case, the storage system under control of operating software uses the physical disks 12 as underlying physical storage for the volumes or LUNs exposed externally.

FIGS. 2-4 illustrate example relationships between the LUNs 22 and file systems 20. FIG. 2 shows a general case in which each of a set of LUNs 22-I, 22-J is associated with a single corresponding one of a set of file systems 20-I, 20-J, and each file system 20 manages the storage of physical blocks of the corresponding LUN 22.

FIGS. 3 and 4 illustrate slightly more complex relationships that may be applicable when features such as replication or de-duplication are in use. FIG. 3 shows a case in which two LUNs 22-Y and 22-Z are both associated with one file system 20-Y. In this case, the file system 20-Y is responsible for maintaining the data mapping for both LUNs 22-Y and 22-Z, which presumably have some operational relationship that requires or takes advantage of the shared use of a single file system 20. If the LUNs 22-Y and 22-Z form a de-duplication domain, for example, then the file system 20-Y can map the data of these LUNs to three pieces of underlying physical storage, namely (1) a first piece for data blocks unique to LUN 22-Y, (2) a second piece for data blocks unique to LUN 22-Z, and (3) a third piece for data blocks that are identical between the two LUNs 22-Y and 22-Z, along with information mapping these shared blocks to corresponding blocks of the LUNs 22-Y and 22-Z. In FIG. 3, it is assumed that file system 20-Y is mounted at SP-B, and that SP-B also presents the LUNs 22-Y and 22-Z to external users.

FIG. 4 shows a similar case as that of FIG. 3, except that LUN 22-Y and LUN 22-X share a file system 20-X mounted on SP A. In this case, the redirectors 18 cooperate to direct storage requests for LUN 22-Y received at SP B to SP A where the requests are handled by file system 20-X. This operation is described in more detail below.

FIG. 5 shows a storage processor 10 of FIG. 1 from a hardware perspective. It includes processing circuitry (PROCESSOR) 28, network (NW) interface circuitry 30 for coupling the storage system 10 to an external network (not shown), and device (DEV) interface circuitry 32 for coupling the processing circuitry 28 to the physical disks 12. The processing circuitry 28 contains memory and computer program instruction execution logic, and it stores and executes computer program instructions that correspond to the functional components shown in FIG. 1, i.e., to the driver upper layer 16, redirector 18, and file systems 20. As indicated above, it may also execute a network file system or other higher-level storage-oriented application providing storage functionality to the external hosts.

As described above, the storage system provides a form of load balancing between the storage processors 10, specifically in the form of transferring ownership of block file systems 20 between the SPs 10 to reduce the extent to which storage requests are redirected from one SP 10 to the other. This process has three essential components, including (1) maintaining counts of storage requests that are received locally (i.e., by the counting SP) versus via redirection (from another SP), (2) periodically analyzing the counts to determine whether a file system 20 should be transferred for load balancing reasons, and (3) when indicated, performing specific steps to effect such a transfer of a file system 20. These processes are described below with reference to FIGS. 6-9.

Figure 6:
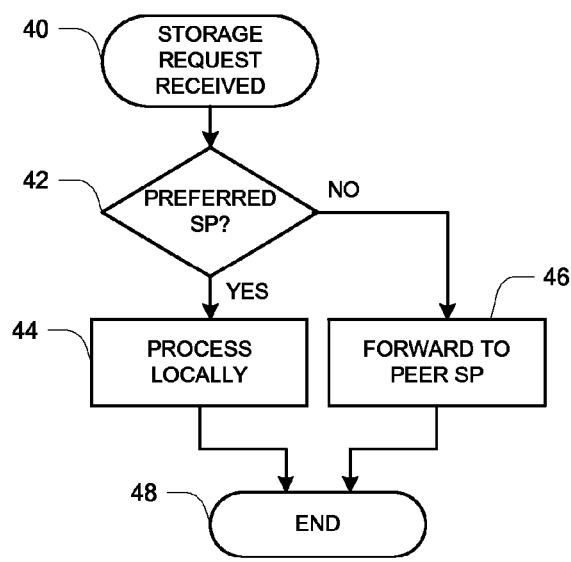
FIGS. 6-9 are flow diagrams of operations conducted by the storage system.

FIG. 6 shows the processing of a storage request (read or write) received by an SP 10, specifically initial processing which begins at 40 with receipt of the request at a redirector 18. The request specifies a particular target LUN 22, whose underlying file system 20 may or may not be owned by (mounted on) the SP 10 that receives the request. At 42, the redirector 18 of the receiving SP 10 determines whether this SP 10 is the "preferred" SP 10 for requests to this LUN 22, which is the case if this SP 10 owns the underlying file system 20. The tracking and querying of preferred SPs 10 may be accomplished through use of an indicator or flag variable associated with each LUN 22. In this description, a set of LUNs 22 sharing a file system 20 is referred to as a "domain". At the time of configuration of a domain and its underlying file system 20, the per-LUN indicator on the owning SP 10 is set to a first value indicating that it is the preferred SP 10 for each LUN of the file system 10, whereas this indicator is set to a second value on the other, non-owning SP(s) 10 indicating that the other SP(s) are the preferred SP 10. The test at 42 thus involves examining the value of this indicator. If the file system 20 is owned by this SP 10, then processing proceeds to step 44, and otherwise it proceeds to step 46.

At step 44 the storage request is processed locally, i.e., using the file system 20 which is owned by the SP 10 that received the request. As generally known in the art, such processing involves either or both reading data from or writing data to physical disks 12 that are mapped to the target LUN 22, utilizing the services of the target block file system 20. Once the request has been processed, the procedure ends at 48.

At step 46, the request is forwarded to the SP 10 that owns the file system 20, referred to as a "peer" SP 10, where the request will be processed. In an embodiment such as that of FIG. 1 having only two SPs 10, the peer SP 10 is the other SP of the pair, and in this case a binary "Preferred" indicator is sufficient to inform an SP 10 that it should forward (redirect) the request to the other SP 10. In other embodiments employing more than two SPs 10, it may be necessary for each SP 10 to store an indication of which peer SP 10 is preferred. Once the request has been forwarded at step 46, the procedure ends at 48.

Figure 7:
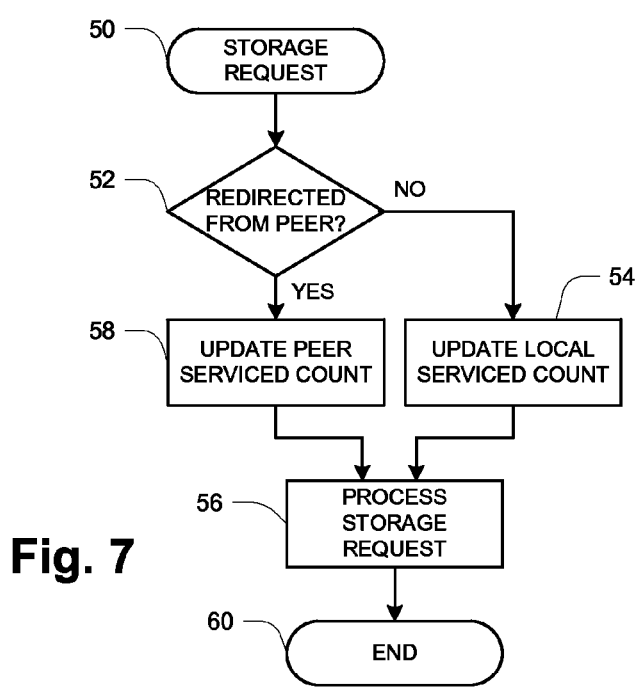

FIG. 7 shows the processing of a storage request by a file system 20, which begins at 50 with receiving the request from a redirector 18. At 52 it is determined whether the request was received (redirected) from a peer SP 10, as opposed to being received via the redirector 18 of the same SP 10 on which the file system 20 resides. If the request was not redirected, then processing continues to 54 where a "local serviced count" is updated (incremented), and then to 56 where file system operations are performed as necessary in satisfaction of the storage request 56. The "local serviced count" is a count of storage requests to the target LUN 22 that were received directly from an external requestor (e.g., from a host) by the same SP 10 that owns the file system 20.

If the test at 52 indicates that the storage request was redirected from a peer SP 10, then at 58 a "peer serviced count" is updated (incremented), and then the operations of 56 are performed. The "peer serviced count" is a count of storage requests to the target LUN 22 that were received (redirected) from a peer SP 10 as described above with reference to FIG. 6. In an embodiment having only two SPs 10 such as shown in FIG. 1, only one peer serviced count for the one other SP 10 need be maintained, while in other embodiments having more than two SPs 10 it may be necessary to employ separate peer counts for different peer SPs 10.

Figure 8:
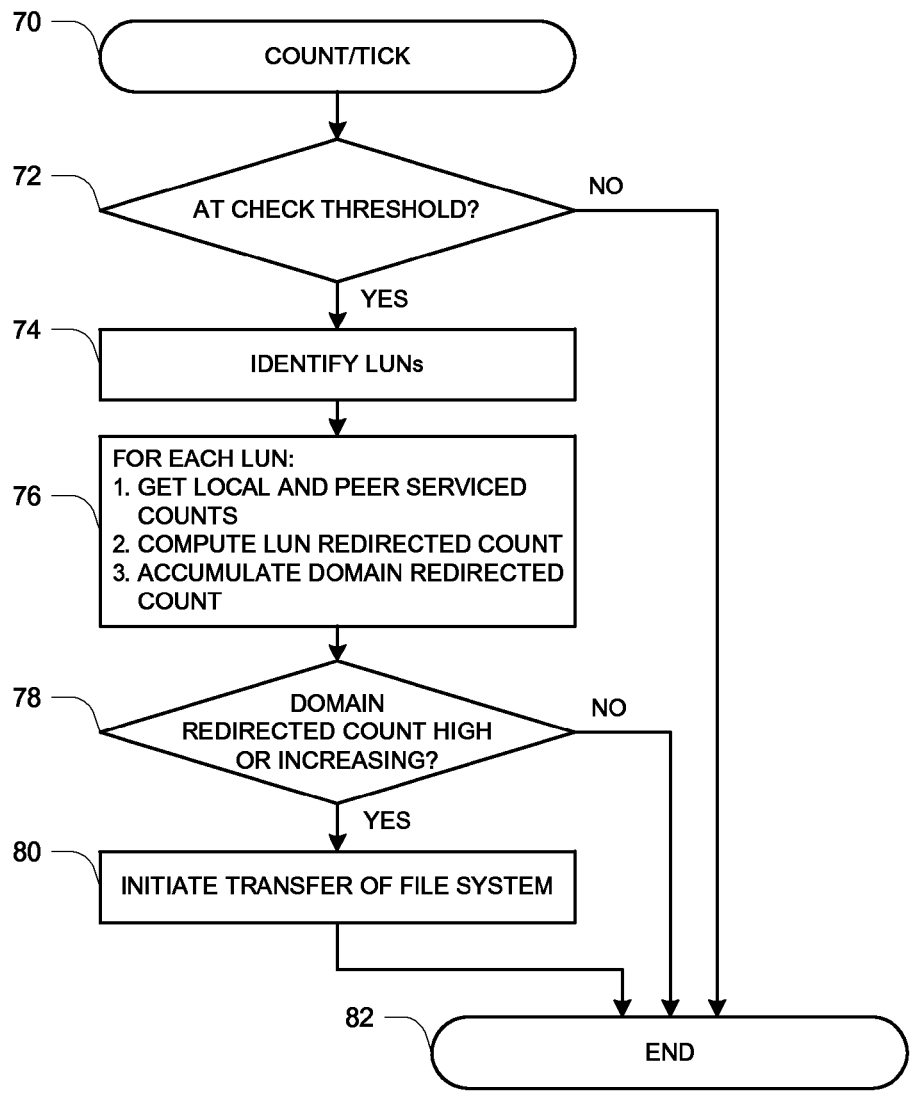

FIG. 8 shows a process of periodically checking whether to initiate a transfer of ownership of a file system 20 to another SP 10. It begins at 70 with an advance of a meter, as indicated by "count/tick" (referring to a repeating event (count) or a timer (tick) as the meter). In one embodiment, the procedure may be performed for each storage request processed by the file system 20, and thus be an extension of the processing of FIG. 7. At 72, it is determined whether the meter (e.g., count of a succession of storage requests) has reached a "check threshold" at which a check for a need to transfer ownership of the file system 20 is done. The check threshold may be selected to provide a sufficiently long interval over which a sufficient number of storage requests are received, to provide meaningful information about the amount of redirection (current as well as trend, as explained below). If the check threshold has been reached, then a procedure including steps 74-80 is performed, and otherwise the procedure ends at 82.

At 74, the LUNs 22 that share the file system 20 are identified, and at 76 several steps are performed for each such LUN 22. First, the values of the local count and peer serviced counts for the LUN 22 (refs. 54 and 58 of FIG. 7) are obtained, then these are used to compute a LUN redirected count (which is the difference between the peer count and the local count). Note that the LUN redirected count may be negative, indicating that more local requests were processed than redirected requests over the most recent interval. The LUN redirected count is then added to an accumulated domain redirected count, which is the sum of the LUN redirected counts of all LUNs 22 sharing the target file system 20.

At 78, it is determined whether the domain redirected count is either above a threshold (indicated as "high") or is increasing above some threshold rate (indicated as "increasing"). These thresholds are set so that they will be exceeded when there is a trend of storage requests being received at a non-preferred SP 10. Exact values for these thresholds will depend on a variety of factors, including the length of the checking interval established by the check threshold. The "high" threshold is a value compared to the accumulated domain redirected count computed at 76. The check for an increasing count may be done in a variety of ways. For example, in each check interval an indicator might be set if the count has increased by more than some predetermined amount over the interval, and the values of these indicators are saved over a recent succession of check intervals. The "increasing" threshold may specify a minimum number of these successive check intervals for which this indicator must be set to satisfy the "increasing" test.

As indicated above, the check threshold might be any of several types of values. Examples include:
Time based (e.g. check every 5 minutes)
I/O bandwidth based (e.g. check every 64 MB worth of reads/writes)
Count on the number of I/Os received (e.g. check every 64K I/Os received)

If at 78 it is determined that the amount of redirection is too great or increasing too much, then at 80 a process of transferring ownership of the file system 20 is initiated. This procedure is described below with reference to FIG. 9. Upon initiation of the transfer at 80, or in the event that the test at 78 is not satisfied, then the procedure of FIG. 8 ends at 82.

Figure 9:
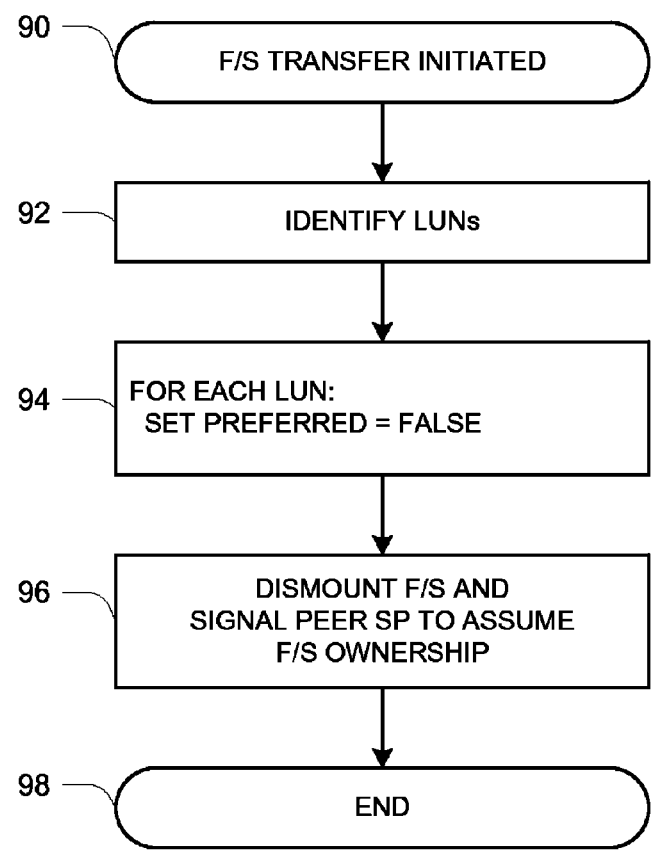

FIG. 9 illustrates the process by which the ownership of the file system 20 is transferred upon initiation by the procedure of FIG. 8, which begins at 90. At 92, the owning SP 10 identifies all the LUNs 22 that share the file system 20, and at 94 it sets the "Preferred" indicator for each LUN 22 to FALSE, indicating that this SP 10 is not the preferred SP 10 for receiving storage requests for these LUNs 22. At 96, the owning SP 10 dismounts the file system 20 and sends a message to the peer SP 10 indicating that it is to assume ownership of the file system 20. Although not shown in FIG. 9, the peer SP 10 responds by mounting the file system 20 and setting the "Preferred" indicator for each of the subject LUNs 22 to TRUE, indicating that the peer SP 10 is now the preferred SP 10 for receiving storage requests for these LUNs 22. Once the message is sent at 96, the procedure ends at 98.

Upon completion of the process of FIG. 9, subsequent storage requests sent to the new owning SP 10 are processed locally rather than being redirected to the SP 10 that previously owned the SP 10, so that the amount of redirection occurring in the storage system is reduced.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a storage system having a set of storage processors coupled to a set of physical storage devices, each storage processor including a processor, network interface circuitry coupling the processor to a network via which storage requests for data of the storage system are received from external users of the storage system, and device interface circuitry coupling the processor to the set of storage devices, comprising:

operating the storage system as a network-attached storage system implementing a network file system, the network file system exposing storage resources to the external users as volumes of the network file system and using respective logical units of storage internally to represent units of storage assigned to the volumes;

using a block-level file system to handle block-level physical data storage operations for data of two or more of the logical units of storage based on corresponding storage requests directed to the volumes presented to the external users of the storage system, each logical unit of storage being organized into a respective array of data blocks and being associated with a respective distinct file in the block-level file system, the block-level file system including file-system program instructions executed at any given time by the processor of an owning one of the storage processors, the processor having the file block-level system mounted thereon and providing access to the data blocks of each of the logical units of storage; and by the respective processor at each of the storage processors:

executing redirector program instructions of a redirector to continually perform a redirection operation by which storage requests for data of the logical units of storage are redirected to the processor of the owning storage processor from the respective processor of each other storage processor of the set receiving the storage requests; and by execution of the file-system program instructions, periodically (1) evaluating an amount of redirection occurring for the storage requests, and (2) if the amount of redirection is higher than a predetermined threshold, then dismounting the block-level file system at the processor of the owning storage processor and mounting the block-level file system at the processor of another storage processor to reduce the amount of redirection, and otherwise refraining from the dismounting and mounting.

2. A method according to claim 1, further including, by execution of the redirector instructions at each of the storage processors, maintaining an indicator of a preferred storage processor for each of the logical units of storage, and wherein performing the redirection operation includes, for each storage request, examining the indicator for a target one of the logical units of storage being accessed by the storage request.

3. A method according to claim 2, further including:
in conjunction with dismounting the block-level file system at the owning storage processor, setting the respective indicators at the owning storage processor for the logical units of storage to a value indicating that the owning storage processor is not the preferred storage processor; and
in conjunction with mounting the block-level file system at the other storage processor, setting the indicators at the other storage processor for the logical units of storage to a value indicating that the other storage processor is the preferred storage processor.

4. A method according to claim 1, further including, by the block-level file system at the owning storage processor, maintaining a local serviced count and a peer serviced count, the local serviced count tracking a first number of the storage requests received directly at the owning storage processor, the peer serviced count tracking a second number of the storage requests redirected to the owning storage processor from the other storage processor, and wherein periodically evaluating the amount of redirection includes:

over an interval of processing the storage requests, monitoring progression of a counter or timer to a check threshold;
when the counter or timer reaches the check threshold, calculating a difference between the peer serviced count and local serviced count; and
comparing the calculated difference with a predetermined threshold corresponding to a maximum acceptable amount of redirection.

5. A method according to claim 4, wherein the check threshold is a predetermined number of storage requests to be processed between successive evaluations of the amount of redirection, and wherein monitoring progression of a counter or timer includes, in conjunction with processing each of the storage requests:
incrementing a count of storage requests processed over the interval; and comparing the count to the check threshold.

6. A method according to claim 1, wherein:
the set of storage processors includes exactly two storage processors; and
determining that the amount of redirection is higher than the predetermined threshold automatically identifies the one other storage processor as the storage processor on which the block-level file system is to be mounted.

7. A method according to claim 1, wherein:
the set of storage processors includes more than two storage processors;
the redirector of the owning storage processor maintains respective indicators of amounts of redirection from each of the other storage processors; and
mounting the block-level file system at the processor of the other storage processor includes identifying the storage processor having a highest amount of redirection as indicated by its indicator, and signaling to the processor of that storage processor that it is to mount the block-level file system.

8. A method according to claim 1, wherein the logical units of storage are mapped logical units whose underlying physical storage is allocated dynamically as needed during regular operation.

9. A method according to claim 8, wherein the logical units of storage are members of a deduplication domain in which data duplicated on two or more of the logical units is mapped by the block-level file system to a single physical instance of the data on the physical storage devices.

10. A method according to claim 8, wherein the logical units of storage are members of a replica set in which data of one logical unit of storage is replicated by operation of the block-level file system on another of the logical units of storage.

11. A method according to claim 1, wherein:
the processor of each storage processor has respective direct access to the set of physical storage devices and the data blocks of the logical units of storage stored thereon, the direct access excluding the processor of each of the other storage processors;
the processor of the owning storage processor provides access to the data blocks of each of the logical units of storage using the direct access of the processor of the owning storage processor;
the redirection operation by the processor of a non-owning storage processor includes refraining from using the direct physical access of the processor of the non-owning processor; and
mounting the block-level file system at the processor of the other storage processor includes transitioning from the refraining to the using of the direct physical access of the processor of the other storage processor without moving the data blocks of the logical units of storage among the physical storage devices, and dismounting the block-level file system at the processor of the owning storage processor includes transitioning from the using to the refraining from using of the direct physical access of the processor of the owning storage processor without moving the data blocks of the logical units of storage among the physical storage devices.

12. A storage system, comprising:
a set of physical storage devices;
a set of storage processors coupled to the physical storage devices to perform data storage operations thereon, each storage processor including a processor, network interface circuitry coupling the processor to a network via which storage requests for data of the storage system are received from external users of the storage system, and device interface circuitry coupling the processor to the set of storage devices; and
the processors of the storage processors being operative to execute computer program instructions to cause the storage system to perform a method including:
    operating the storage system as a network-attached storage system implementing a network file system, the network file system exposing storage resources to the external users as volumes of the network file system and using respective logical units of storage internally to represent units of storage assigned to the volumes;
    using a block-level file system to handle block-level physical data storage operations for data of two or more logical units of storage presented to external users of the storage system, each logical unit of storage being organized into a respective array of data blocks and being associated with a respective distinct file in the block-level file system, the block-level file system including file-system program instructions executed at any given time by the processor of an owning one of the storage processors, the processor having the block-level file system mounted thereon and providing access to the data blocks of each of the logical units of storage; and
    by the respective processor at each of the storage processors:
        executing redirector program instructions of a redirector to continually perform a redirection operation by which storage requests for data of the logical units of storage are redirected to the processor of the owning storage processor from the respective processor of each other storage processor of the set receiving the storage requests; and
    by execution of the file-system program instructions, periodically (1) evaluating an amount of redirection occurring for the storage requests, and (2) if the amount of redirection is higher than a predetermined threshold, then dismounting the block-level file system at the processor of the owning storage processor and mounting the block-level file system at the processor of another storage processor to reduce the amount of redirection, and otherwise refraining from the dismounting and mounting.

13. A storage system according to claim 12, wherein the method performed by the storage system further includes, by execution of the redirector instructions at each of the storage processors, maintaining an indicator of a preferred storage processor for each of the logical units of storage, and wherein performing the redirection operation includes, for each storage request, examining the indicator for a target one of the logical units of storage being accessed by the storage request.

14. A storage system according to claim 13, wherein the method performed by the storage system further includes:
    in conjunction with dismounting the block-level file system at the owning storage processor, setting the respective indicators at the owning storage processor for the logical units of storage to a value indicating that the owning storage processor is not the preferred storage processor; and
    in conjunction with mounting the block-level file system at the other storage processor, setting the indicators at the other storage processor for the logical units of storage to a value indicating that the other storage processor is the preferred storage processor.

15. A storage system according to claim 12, wherein the method performed by the storage system further includes, by the block-level file system at the owning storage processor, maintaining a local serviced count and a peer serviced count, the local serviced count tracking a first number of the storage requests received directly at the owning storage processor, the peer serviced count tracking a second number of the storage requests redirected to the owning storage processor from the other storage processor, and wherein periodically evaluating the amount of redirection includes:
    over an interval of processing the storage requests, monitoring progression of a counter or timer to a check threshold;
    when the counter or timer reaches the check threshold, calculating a difference between the peer serviced count and local serviced count; and
    comparing the calculated difference with a predetermined threshold corresponding to a maximum acceptable amount of redirection.

16. A storage system according to claim 15, wherein the check threshold is a predetermined number of storage requests to be processed between successive evaluations of the amount of redirection, and wherein monitoring progression of a counter or timer includes, in conjunction with processing each of the storage requests:
    incrementing a count of storage requests processed over the interval; and comparing the count to the check threshold.

17. A storage system according to claim 12, wherein:
the set of storage processors includes exactly two storage processors; and
determining that the amount of redirection is higher than the predetermined threshold automatically identifies the one other storage processor as the storage processor on which the block-level file system is to be mounted.

18. A storage system according to claim 12, wherein:
the set of storage processors includes more than two storage processors;
the redirector of the owning storage processor maintains respective indicators of amounts of redirection from each of the other storage processors; and
mounting the block-level file system at the processor of the other storage processor includes identifying the storage processor having a highest amount of redirection as indicated by its indicator, and signaling to the processor of that storage processor that it is to mount the block-level file system.

19. A storage system according to claim 12, wherein the logical units of storage are mapped logical units whose underlying physical storage is allocated dynamically as needed during regular operation.

20. A storage system according to claim 19, wherein the logical units of storage are members of a deduplication domain in which data duplicated on two or more of the logical units is mapped by the block-level file system to a single physical instance of the data on the physical storage devices.

21. A storage system according to claim 19, wherein the logical units of storage are members of a replica set in which data of one logical unit of storage is replicated by operation of the block-level file system on another of the logical units of storage.

* * * * *